(12) United States Patent
Bergsten et al.

(10) Patent No.: US 6,862,689 B2
(45) Date of Patent: Mar. 1, 2005

(54) METHOD AND APPARATUS FOR MANAGING SESSION INFORMATION

(75) Inventors: Bjorn Bergsten, Marlborough, MA (US); Praveen G. Mutalik, Southbourough, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 656 days.

(21) Appl. No.: 09/833,835

(22) Filed: Apr. 12, 2001

(65) Prior Publication Data

US 2002/0152429 A1 Oct. 17, 2002

(51) Int. Cl.[7] .............................................. G06F 11/00
(52) U.S. Cl. .................................. 714/4; 714/6; 714/15
(58) Field of Search ................................. 714/4, 15, 6

(56) References Cited

U.S. PATENT DOCUMENTS

| | | | |
|---|---|---|---|
| 3,460,094 A | 8/1969 | Pryor et al. | 340/172.5 |
| 3,469,239 A | 9/1969 | Richmond et al. | 340/172.5 |
| 3,469,241 A | 9/1969 | Barton et al. | 340/172.5 |
| 3,544,973 A | 12/1970 | Borck et al. | 340/172.5 |
| 3,548,382 A | 12/1970 | Lichty et al. | 340/172.5 |
| 3,609,704 A | 9/1971 | Shurter | 340/172.5 |
| 3,641,505 A | 2/1972 | Artz et al. | 340/172.5 |
| 3,705,388 A | 12/1972 | Nishimoto | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 235/153 |

(List continued on next page.)

FOREIGN PATENT DOCUMENTS

| | | | |
|---|---|---|---|
| EP | 0 208 430 | 1/1987 | ................... 13/32 |
| EP | 0 428 330 A3 | 5/1991 | ................... 13/30 |
| EP | 0 406 759 A3 | 9/1991 | ................... 12/56 |
| EP | 0 461 924 A2 | 12/1991 | .......... G06F/12/08 |
| EP | 0 483 978 A2 | 5/1992 | ............ G07F/7/12 |
| EP | 0 475 005 B1 | 11/1995 | ................... 15/16 |
| EP | 0 390 567 B1 | 6/1999 | ..................... 29/6 |
| FR | 2 508 200 | 12/1982 | |
| WO | WO 95/12848 | 5/1995 | .......... G06F/11/00 |

OTHER PUBLICATIONS

Copy of Invitation to Pay Fees/International Search Report for PCT/US02/11485 (4 pgs.).

Norvag, "The Vagabond Temporal OID Index: An Index Structure for OID Indexing in Temporal Object Database Systems," Department of Computer and Information Science, Norwegian University of Science and Technology, 2000 IEEE, pp. 158–166, Jun. 1999.

*Primary Examiner*—Nadeem Iqbal
*Assistant Examiner*—Timothy M. Bonura
(74) *Attorney, Agent, or Firm*—Testa, Hurwitz & Thiebeault, LLP

(57) ABSTRACT

A method and apparatus for managing session information. In one embodiment, a communication session is established between a client computer and a server computer. When the client computer and the server computer establish the communication session, the client or the server typically stores information about the communication session, which is referred to as "session information." The session information is stored in a first log file stored in a persistent volatile memory and in a cache file stored in a volatile memory of the server. The cache file is reconstructed after a server failure by retrieving the session information stored in the first log file.

21 Claims, 6 Drawing Sheets

U.S. PATENT DOCUMENTS

| | | |
|---|---|---|
| 3,893,084 A | 7/1975 | Kotok et al. .............. 340/172.5 |
| 4,015,246 A | 3/1977 | Hopkins, Jr. et al. ..... 340/172.5 |
| 4,040,034 A | 8/1977 | Belady et al. .............. 364/200 |
| 4,096,572 A | 6/1978 | Namimoto ................. 364/200 |
| 4,164,787 A | 8/1979 | Aranguren ................. 364/200 |
| 4,228,496 A | 10/1980 | Katzman et al. ............ 364/200 |
| 4,296,463 A | 10/1981 | Dalboussiere et al. ...... 364/200 |
| 4,356,550 A | 10/1982 | Katzman et al. ............ 364/200 |
| 4,365,295 A | 12/1982 | Katzman et al. ............ 364/200 |
| 4,366,535 A | 12/1982 | Cedolin et al. ............. 364/200 |
| 4,369,494 A | 1/1983 | Bienvenu et al. ........... 364/200 |
| 4,466,098 A | 8/1984 | Southard ....................... 371/9 |
| 4,484,273 A | 11/1984 | Stiffler et al. .............. 364/200 |
| 4,493,036 A | 1/1985 | Boudreau et al. ........... 364/200 |
| 4,503,499 A | 3/1985 | Mason et al. ............... 364/200 |
| 4,574,348 A | 3/1986 | Scallon ....................... 364/200 |
| 4,590,554 A | 5/1986 | Glazer et al. ............... 364/200 |
| 4,608,631 A | 8/1986 | Stiffler et al. .............. 364/200 |
| 4,608,688 A | 8/1986 | Hansen et al. ................ 371/11 |
| 4,637,024 A | 1/1987 | Dixon et al. .................. 371/67 |
| 4,672,613 A | 6/1987 | Foxworthy et al. ........... 371/38 |
| 4,674,037 A | 6/1987 | Funabashi et al. .......... 364/200 |
| 4,677,546 A | 6/1987 | Freeman et al. ............. 364/200 |
| 4,695,975 A | 9/1987 | Bedrij ....................... 364/900 |
| 4,700,292 A | 10/1987 | Campanini ................. 364/200 |
| 4,716,523 A | 12/1987 | Burrus, Jr. et al. .......... 364/200 |
| 4,719,568 A | 1/1988 | Carrubba et al. ............ 364/200 |
| 4,774,659 A | 9/1988 | Smith et al. ................. 364/200 |
| 4,866,604 A | 9/1989 | Reid ......................... 364/200 |
| 4,920,540 A | 4/1990 | Baty ........................... 371/61 |
| 4,924,427 A | 5/1990 | Savage et al. ............... 364/900 |
| 4,942,517 A | 7/1990 | Cok ........................... 364/200 |
| 4,942,519 A | 7/1990 | Nakayama .................. 364/200 |
| 4,965,717 A | 10/1990 | Cutts, Jr. et al. ............ 364/200 |
| 4,993,030 A | 2/1991 | Krakauer et al. ............ 371/40.1 |
| 5,020,024 A | 5/1991 | Williams .................... 364/900 |
| 5,115,490 A | 5/1992 | Komuro et al. .............. 395/400 |
| 5,175,855 A | 12/1992 | Putnam et al. .............. 395/700 |
| 5,193,162 A | 3/1993 | Bordsen et al. ............. 395/425 |
| 5,193,180 A | 3/1993 | Hastings .................... 395/575 |
| 5,195,040 A | 3/1993 | Goldsmith .................. 364/443 |
| 5,231,640 A | 7/1993 | Hanson et al. .............. 371/68.3 |
| 5,276,860 A | 1/1994 | Fortier et al. ............... 395/575 |
| 5,280,612 A | 1/1994 | Lorie et al. .................. 395/600 |
| 5,280,619 A | 1/1994 | Wang ......................... 395/725 |
| 5,283,870 A | 2/1994 | Joyce et al. ................. 395/200 |
| 5,295,258 A | 3/1994 | Jewett et al. ................ 395/575 |
| 5,317,726 A | 5/1994 | Horst .......................... 395/575 |
| 5,321,706 A | 6/1994 | Holm et al. ................. 371/51.1 |
| 5,335,334 A | 8/1994 | Takahashi et al. ........... 395/425 |
| 5,357,612 A | 10/1994 | Alaiwan ..................... 395/200 |
| 5,359,713 A | 10/1994 | Moran et al. ................ 395/200 |
| 5,371,885 A | 12/1994 | Letwin ....................... 395/600 |
| 5,383,161 A | 1/1995 | Sanemitsu ............. 365/230.06 |
| 5,384,906 A | 1/1995 | Horst .......................... 395/550 |
| 5,386,524 A | 1/1995 | Lary et al. ................... 395/400 |
| 5,388,242 A | 2/1995 | Jewett ........................ 395/425 |
| 5,404,361 A | 4/1995 | Casorso et al. ............. 371/40.1 |
| 5,423,037 A | 6/1995 | Hvasshovd .................. 395/600 |
| 5,423,046 A | 6/1995 | Nunnelley et al. ........... 395/750 |
| 5,426,747 A | 6/1995 | Weinreb et al. .............. 395/400 |
| 5,440,710 A | 8/1995 | Richter et al. ............... 395/417 |
| 5,440,727 A | 8/1995 | Bhide et al. ................. 395/444 |
| 5,440,732 A | 8/1995 | Lomet et al. ................ 395/600 |
| 5,454,091 A | 9/1995 | Sites et al. .................. 395/413 |
| 5,463,755 A | 10/1995 | Dumarot et al. ............. 395/475 |
| 5,465,328 A | 11/1995 | Dievendorff et al. .. 395/182.13 |
| 5,475,860 A | 12/1995 | Ellison et al. ............... 395/846 |
| 5,479,648 A | 12/1995 | Barbera et al. .............. 395/750 |
| 5,497,476 A | 3/1996 | Oldfield et al. .............. 395/439 |
| 5,504,873 A | 4/1996 | Martin et al. ................ 395/438 |
| 5,513,314 A | 4/1996 | Kandasamy et al. ... 395/182.04 |
| 5,524,212 A | 6/1996 | Somani et al. ......... 395/200.08 |
| 5,550,986 A | 8/1996 | DuLac ....................... 395/280 |
| 5,551,020 A | 8/1996 | Flax et al. ................... 395/600 |
| 5,555,404 A | 9/1996 | Torbjørnsen et al. ........ 395/600 |
| 5,557,770 A | 9/1996 | Bhide et al. ................. 295/488 |
| 5,566,316 A | 10/1996 | Fechner et al. .............. 395/441 |
| 5,568,629 A | 10/1996 | Gentry et al. ................ 395/441 |
| 5,581,750 A | 12/1996 | Haderle et al. .............. 395/618 |
| 5,584,008 A | 12/1996 | Shinada et al. .............. 395/441 |
| 5,584,018 A | 12/1996 | Kamiyama .................. 395/492 |
| 5,586,253 A | 12/1996 | Green et al. ................. 395/411 |
| 5,586,291 A | 12/1996 | Lasker et al. ................ 395/440 |
| 5,586,310 A | 12/1996 | Sharman ..................... 395/600 |
| 5,606,681 A | 2/1997 | Smith et al. ................. 395/413 |
| 5,608,901 A | 3/1997 | Letwin ....................... 395/621 |
| 5,619,671 A | 4/1997 | Bryant et al. ................ 395/412 |
| 5,627,961 A | 5/1997 | Sharman ................ 395/182.04 |
| 5,628,023 A | 5/1997 | Bryant et al. ................ 395/800 |
| 5,632,031 A | 5/1997 | Velissaropoulos et al. .. 395/611 |
| 5,651,139 A | 7/1997 | Cripe et al. .................. 395/490 |
| 5,664,172 A | 9/1997 | Antoshenkov ............... 395/604 |
| 5,682,513 A | 10/1997 | Candelaria et al. ......... 395/440 |
| 5,687,392 A | 11/1997 | Radko ........................ 395/842 |
| 5,720,027 A | 2/1998 | Sarkozy et al. ........ 395/182.04 |
| 5,721,918 A | 2/1998 | Nilsson et al. .............. 395/618 |
| 5,724,581 A | 3/1998 | Kozakura .................... 395/618 |
| 5,742,792 A | 4/1998 | Yanai et al. ................. 395/489 |
| 5,745,913 A | 4/1998 | Pattin et al. ................. 711/105 |
| 5,754,821 A | 5/1998 | Cripe et al. .................. 395/491 |
| 5,784,699 A | 7/1998 | McMahon et al. .......... 711/171 |
| 5,794,035 A | 8/1998 | Golub et al. ................. 395/674 |
| 5,799,324 A | 8/1998 | McNutt et al. .............. 707/206 |
| 5,815,649 A | 9/1998 | Utter et al. ............. 395/112.04 |
| 5,819,109 A | 10/1998 | Davis ......................... 395/835 |
| 5,838,894 A | 11/1998 | Horst .................... 395/182.09 |
| 5,838,899 A | 11/1998 | Leavitt et al. .......... 395/185.09 |
| 5,850,632 A | 12/1998 | Robertson ................... 711/170 |
| 5,860,126 A | 1/1999 | Mittal ........................ 711/167 |
| 5,862,145 A | 1/1999 | Grossman et al. ........... 371/5.1 |
| 5,875,465 A | 2/1999 | Kilpatrick et al. ........... 711/134 |
| 5,892,928 A | 4/1999 | Wallach et al. .............. 395/283 |
| 5,894,560 A | 4/1999 | Carmichael et al. ........ 395/845 |
| 5,915,107 A | 6/1999 | Maley et al. ................ 395/551 |
| 5,918,229 A | 6/1999 | Davis et al. .................. 707/10 |
| 5,920,876 A | 7/1999 | Ungar et al. ................. 707/206 |
| 5,920,898 A | 7/1999 | Bolyn et al. ................. 711/167 |
| 5,933,838 A | 8/1999 | Lomet ........................ 707/202 |
| 5,949,972 A | 9/1999 | Applegate .............. 395/185.07 |
| 5,953,538 A | 9/1999 | Duncan et al. .............. 395/842 |
| 5,953,742 A | 9/1999 | Williams .................... 711/154 |
| 5,956,756 A | 9/1999 | Khalidi et al. .............. 711/207 |
| 5,959,923 A | 9/1999 | Matteson et al. ............ 365/222 |
| 5,960,459 A | 9/1999 | Thome et al. ............... 711/154 |
| 5,987,620 A | 11/1999 | Tran .......................... 713/600 |
| 5,990,914 A | 11/1999 | Horan et al. ................. 345/521 |
| 5,996,055 A | 11/1999 | Woodman ................... 711/203 |
| 6,000,007 A | 12/1999 | Leung et al. ................ 711/105 |
| 6,012,106 A | 1/2000 | Schumann et al. ........... 710/22 |
| 6,012,120 A | 1/2000 | Duncan et al. ................ 710/22 |
| 6,016,495 A | 1/2000 | McKeehan et al. ......... 707/103 |
| 6,021,456 A | 2/2000 | Herdeg et al. ............... 710/260 |
| 6,024,475 A | 2/2000 | Kufrovich et al. ........... 362/576 |
| 6,026,465 A | 2/2000 | Mills et al. .................. 711/103 |
| 6,026,475 A | 2/2000 | Woodman ................... 711/202 |
| 6,047,343 A | 4/2000 | Olarig ........................ 710/102 |
| 6,055,617 A | 4/2000 | Kingsbury .................. 711/203 |
| 6,065,017 A | 5/2000 | Barker ....................... 707/202 |
| 6,067,550 A | 5/2000 | Lomet ........................ 707/202 |
| 6,067,608 A | 5/2000 | Perry ......................... 711/203 |

| | | | | | | |
|---|---|---|---|---|---|---|
| 6,085,200 A | 7/2000 | Hill et al. ............... 707/202 | | 6,138,198 A | 10/2000 | Garnett et al. ............ 710/129 |
| 6,085,296 A | 7/2000 | Karkhanis et al. ......... 711/147 | | 6,141,722 A | 10/2000 | Parsons .................... 711/2 |
| 6,098,074 A | 8/2000 | Cannon et al. ............ 707/200 | | 6,141,744 A | 10/2000 | Wing So ................... 712/35 |
| 6,098,137 A | 8/2000 | Goodrum et al. ........... 710/129 | | 6,141,769 A | 10/2000 | Petivan et al. ............ 714/10 |
| 6,105,075 A | 8/2000 | Ghaffari ................... 710/5 | | 6,181,614 B1 | 1/2001 | Aipperspach et al. ....... 365/200 |
| 6,119,128 A | 9/2000 | Courter et al. ............ 707/202 | | 6,397,293 B2 | 5/2002 | Shrader et al. ............ 711/114 |
| 6,119,214 A | 9/2000 | Dirks ..................... 711/206 | | 6,496,942 B1 | 12/2002 | Schoenthal et al. ......... 714/4 |
| 6,119,244 A | 9/2000 | Schoenthal et al. ......... 714/4 | | 6,629,144 B1 * | 9/2003 | Chu et al. ................ 709/227 |
| 6,128,711 A | 10/2000 | Duncan et al. ............ 711/155 | | 2002/0156965 A1 * | 10/2002 | Gusler et al. ............. 711/100 |
| 6,128,713 A | 10/2000 | Eisler et al. ............. 711/159 | | | | |
| 6,134,638 A | 10/2000 | Olarig et al. ............. 711/167 | | * cited by examiner | | |

METHOD AND APPARATUS FOR MANAGING SESSION INFORMATION

FIELD OF THE INVENTION

The present invention relates generally to managing session information and more specifically to managing session information in a client-server environment.

BACKGROUND OF THE INVENTION

Businesses have employed and continue to employ computer systems to conduct economic transactions. These computer systems typically involve a client computer (client) and a server computer (server). The server generally fulfills user requests from the client. When the client and the server conduct a business transaction, such as an electronic shopping session, the client or the server typically stores information about each communication session, generally referred to as "session information". For example, session information may include the items that a user places in a "virtual" shopping cart for purchase, search queries by the user (e.g., a search query for a particular product), and the like.

Typically, the session information should be available for use, such as for modification and/or analysis. For example, if a user peruses and purchases products sold on a web page (i.e., electronic shopping), the server often requests information from the user about the user, such as the user's address and social security number. This information, which is also a portion of the session information, is required for the correct processing and delivering of the user's order.

If the server stores the session information in main memory (e.g., random-access memory) and a server failure occurs, all session information is often erased and typically irretrievable. The client may subsequently have to repeat certain transmissions to rebuild the session information associated with a connection; the performance of the server and/or client often decreases because of such a process. Clients may abandon their transaction because of lost session information, resulting in a loss of sales for the particular business that experienced the server failure.

If the server stores the session information on a persistent mass storage (e.g., disk), then the session information survives a server failure. However, because the persistent mass storage is a mechanical device, the server generally accesses the persistent mass storage less efficiently than the server accesses the computer's memory. Thus, storage of session information on persistent mass storage results in reduced performance that is perceived by the client as a slower response time. This is generally unacceptable.

If the client stores the session information in memory located at the client, a server failure does not erase the session information. However, the session information often contains private information (such as the user's social security number) and the client therefore frequently encrypts transmissions of session information to the server. This encryption increases the complexity of the transaction and also increases the cost of the software needed to implement the encryption and decryption of the data.

Thus, there remains a need to enable the session information to be accessible to the server after a server failure while not decreasing the performance of the server.

SUMMARY OF THE INVENTION

The present invention relates to methods and apparatus for managing session information. One object of the invention is to enable the session information to be accessible to the server after a server failure while not decreasing the performance of the server. Additionally, the apparatus can store all session information so that statistical and data-mining processing can access all session information.

In one aspect, one feature of the invention is to manage session information in a client-server environment. The method includes the steps of establishing a communication session between a client and a server and storing the session information associated with the communication session between the client and the server. A first log located in a persistent volatile memory stores the session information. The method further includes the steps of storing the session information in a cache file stored in a volatile memory of the server and reconstructing the cache file after a server failure using the session information stored in the first log.

In one embodiment, the method includes the step of swapping the first log file with a second log file when a predetermined criteria is met. In one embodiment, the predetermined criteria includes when the size of the first log file exceeds a predefined size. In another embodiment, the predetermined criteria includes when a predetermined amount of time elapses.

In another aspect, a session storage manager for managing session information in a client-server environment includes a first log file stored in a persistent volatile memory. An execution thread stores the session information in the first log file and then transfers the session information to a database cache located in a volatile memory of the server. After a server failure, the session storage manager reconstructs a database cache using the session information stored in the first log file.

In one embodiment, the session storage manager includes a flushing thread that transfers the session information stored in the database cache to the database. The session storage manager also includes a database file stored in a persistent volatile memory and a record cache stored in the volatile memory. In another embodiment, the database file is stored on a disk. The record cache prevents the flushing thread from storing only a portion of the session information to the database.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

Figure 1A:
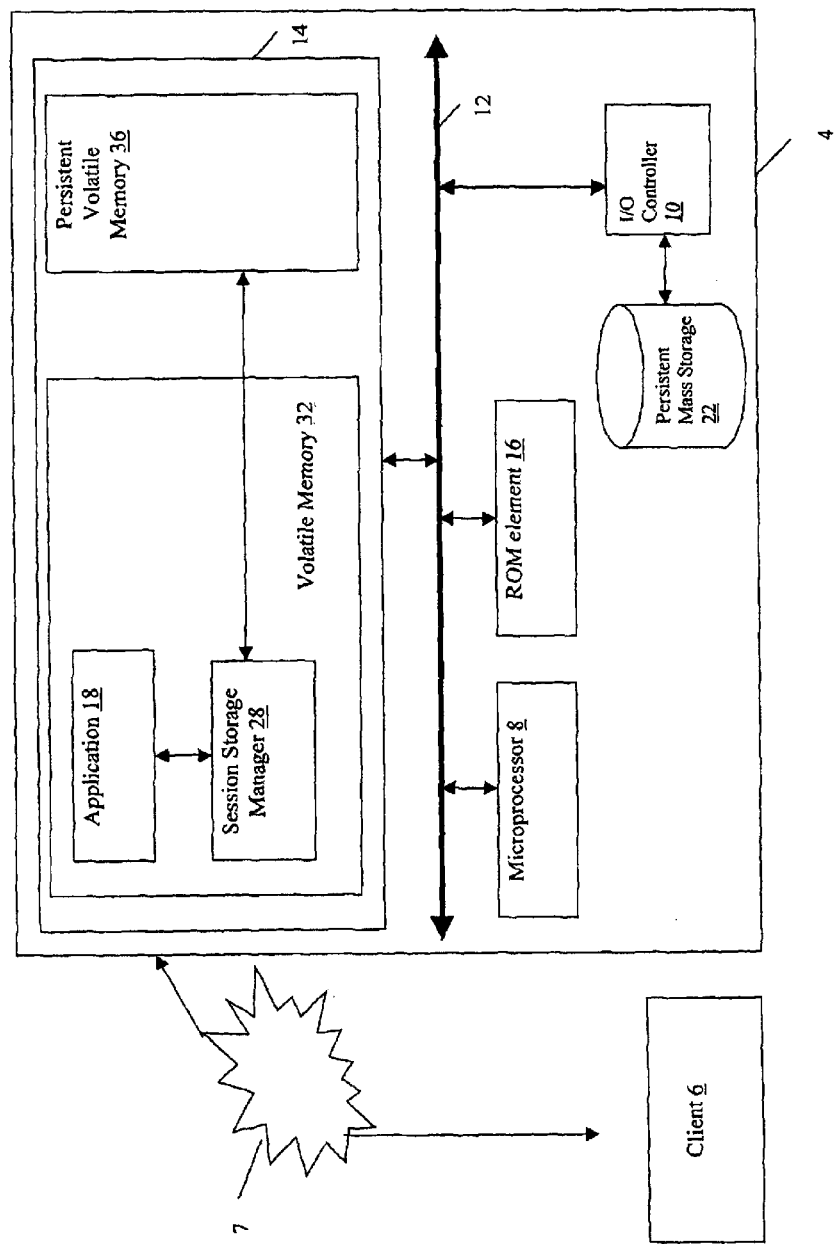
FIG. 1A is a block diagram of an embodiment of a client server system constructed in accordance with the invention.

In brief overview and referring to FIG. 1A, a server computer (server) 4 is in communication with a client computer (client) 6, over a network 7. In another embodiment, the client 6 is in direct communication with the server 4, thus eliminating the network 7. In yet another embodiment, multiple clients (not shown) communicate with the server 4 simultaneously. The server 4 includes a microprocessor 8, a read-only memory (ROM) 16, a random access memory (RAM) 14, and a communications bus 12 allowing communication among these components.

The server 4 and/or the client 6 can be any personal computer, WINDOWS-based terminal (developed by Microsoft Corporation of Redmond, Wash.), network computer, wireless device, information appliance, X-device, workstation, mini computer, main frame computer, personal digital assistant, or other computing device.

In the embodiment shown in FIG. 1A, the server 4 uses an input-output (I/O) controller 10 to communicate with a persistent mass storage 22. The persistent mass storage 22 may be any storage medium that retains data in the absence of electrical power, such as a magnetic disk or magneto-optical drive.

The persistent mass storage 22 may be an internal or external component of the server 4. In particular, the server 4 may be provided with redundant arrays of independent disks (RAID arrays) used as failure-tolerant persistent mass storage 22. The server 4 can also be in communication with a peripheral device (not shown), such as a mouse, printer, alphanumeric keyboard, and display.

The RAM memory 14 and the ROM memory 16 may store programs and/or data. The RAM memory 14 may be, without limitation, dynamic RAM (DRAM), static RAM, synchronous DRAM (SDRAM), double data rate synchronous dynamic RAM (DDR SDRAM), and the like. Similarly, the ROM memory 16 may be, without limitation, electrically erasable programmable read-only memory (EEPROM), a programmable read-only memory (PROM), and the like.

The RAM memory 14 typically contains one or more application programs 18 and an operating system (not shown). Examples of the OS include, but are not limited to, Windows 2000 developed by Microsoft Corporation of Redmond, Wash., OS/2 developed by IBM Corporation of Armonk, N.Y., and Netware developed by Novell, Incorporated of San Jose, Calif.

In the embodiment shown in FIG. 1A, the RAM memory 14 is partitioned into volatile memory 32 and persistent volatile memory 36. As described in greater detail in co-pending U.S. patent application Ser. No. 09/550,108, which is incorporated herein by reference, persistent volatile memory 36 is volatile memory whose contents are resistant to loss or corruption from system or application crashes and the ensuing reboot cycle.

In one embodiment, the client 6 sends a user request over the network 7 to the server 4. The server 4 may then establish a communication session with the client 6. As described in more detail below, when the client 6 and the server 4 establish a communication session, such as a TCP/IP session, the client 6 or the server 4 typically stores information about each communication session, referred to as "session information". For example, session information may include the items that a user places in a "virtual" shopping cart for purchase and/or search queries by the user (e.g., a search query for a particular product). Other session information includes, without limitation, the user's address, phone number, social security number, or birth date.

The volatile memory 32 further includes a session storage manager (SSM) 28. The SSM 28 updates and/or stores session information in the persistent volatile memory 36 without substantially decreasing the performance of the server 4. The SSM 28 initially stores the session information in a cache file (not shown) located in the volatile memory 32 for efficient retrieval of session information. In one embodiment, the SSM 28 transfers the session information from the volatile memory 32 to a database file (not shown) located in the persistent volatile memory 36 or on a disk so that the session information is not lost upon a server failure. In a further embodiment and described in more detail below, the SSM 28 employs two log files as respective backups to the cache file and the database file. Thus, in the event of a failure of the server 4, the SSM 28 can recover the session information from the database file and the log files located in the persistent volatile memory 36.

Figure 1B:
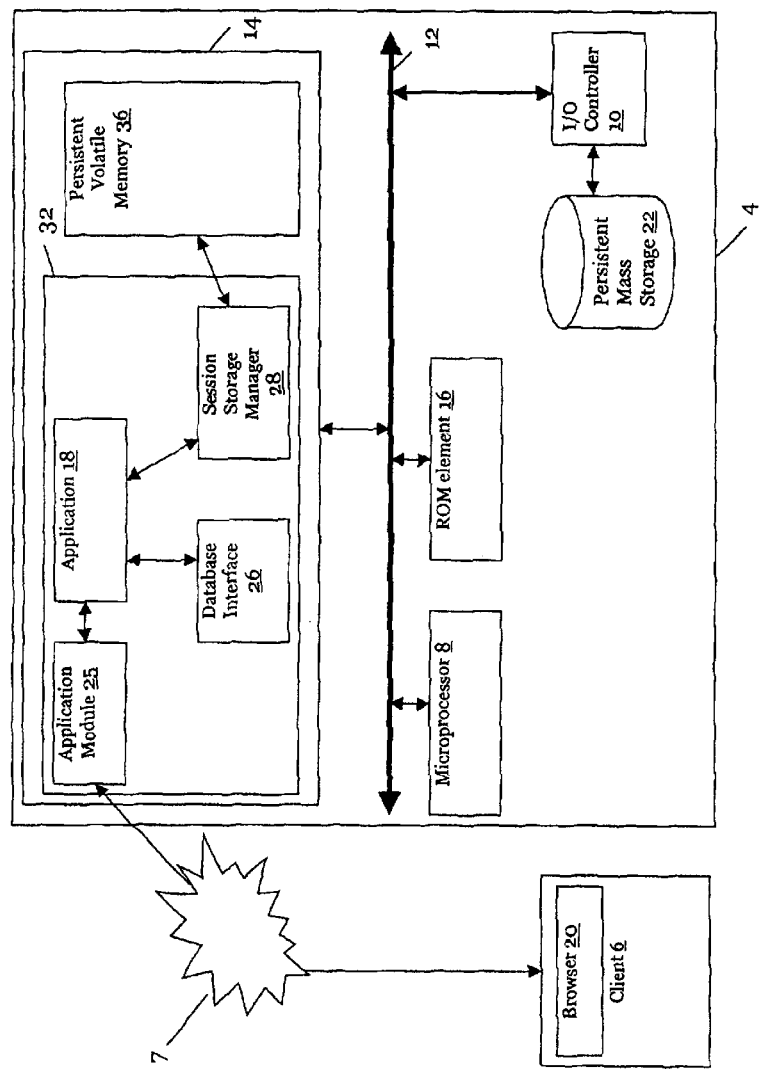
FIG. 1B is a more detailed block diagram of the client server system shown in FIG. 1A.

In more detail and referring to FIG. 1B, the client 6 includes a web browser 20, such as INTERNET EXPLORER developed by Microsoft Corporation in Redmond, Wash., to connect to the network 7.

In one embodiment, the server 4 additionally includes an application module 25 and a database having a database interface 26. In one embodiment, the application module 25 is an Internet Information Server (IIS), developed by Microsoft Corporation of Redmond, Wash. In one embodiment, the application 18 is an "e-commerce" application (an application used to conduct business on the network 7) such as an on-line order taking program.

In operation, the client 6 transmits a user request to the server 4 using, for example, a common gateway interface (CGI) request. The application module 25 passes the received CGI request to the application 18, which can access and update information stored in the database using the database interface 26. The database interface 26 may be an application program interface or a Component Object Model (COM) object. The COM was developed by Microsoft Corporation of Redmond, Wash.

The database (and/or the database interface 26) may be written in a structured query language, such as SQL, developed by IBM Corporation of Armonk, N.Y. In one embodiment, the database interface 26 uses a Lightweight Directory Access Protocol (LDAP) to access information in the database.

In one embodiment, the application 18 instantiates, or creates an instance, of the SSM 28. In a further embodiment, the SSM 28 is a COM object. In one embodiment, the application 18 uses an active server page (ASP), which is a Hypertext Markup Language (HTML) web page that includes one or more scripts (i.e., small embedded programs). In this embodiment, the application 18 invokes one or more scripts to invoke the SSM 28.

Figure 2:
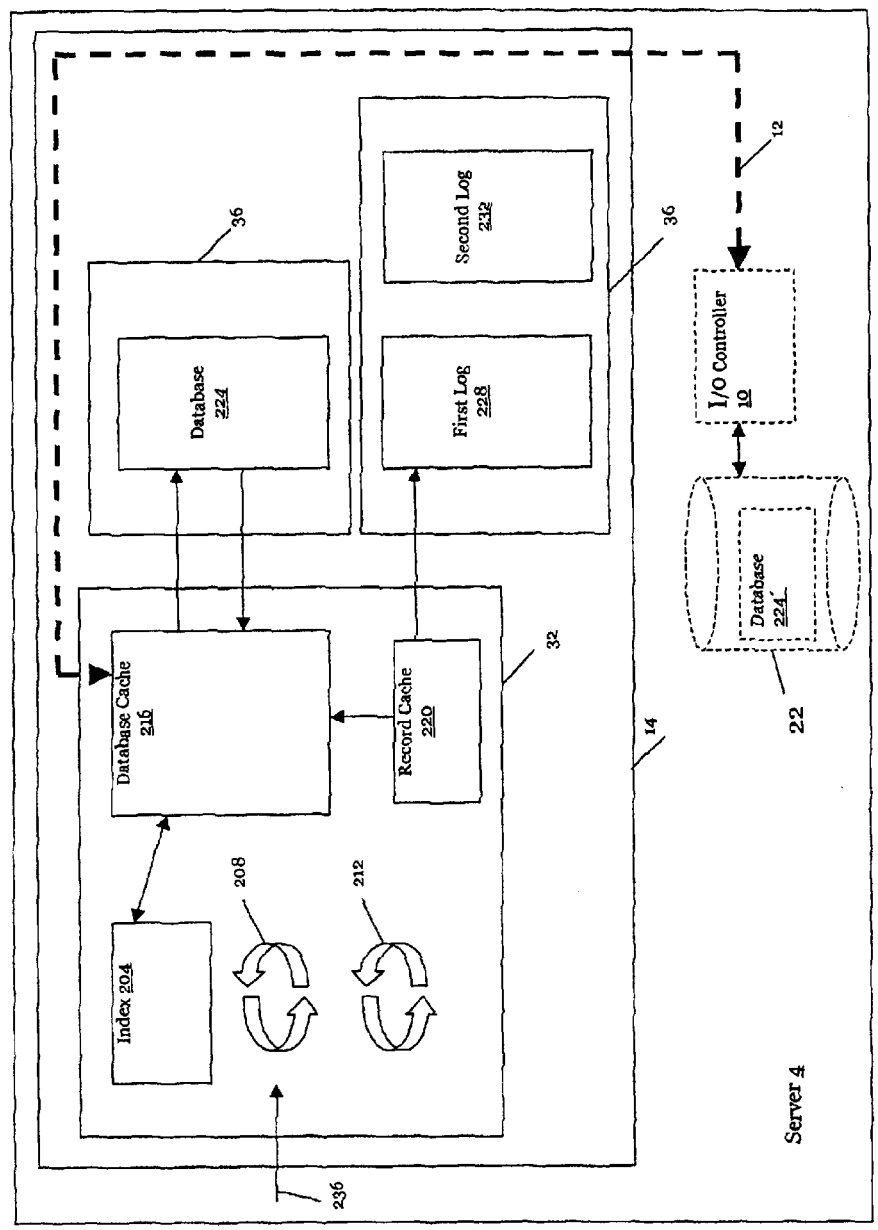
FIG. 2 is a block diagram of an embodiment of the server shown in FIG. 1A.

The general architecture of the SSM 28 is illustrated in FIG. 2. The SSM 28 includes an index 204, an execution thread 208, a flushing thread 212, a database cache 216, and a record cache 220 located in a volatile memory 32 of the server 4. The SSM 28 also uses a database 224, a first log file 228, and a second log file 232.

In one embodiment, the database 224 is a file that stores the session information and is located in the persistent volatile memory 36. In another embodiment, a database 224' (shown in phantom) contains the session information and is located in the persistent mass storage 22.

The database cache 216 is a file located in the volatile memory 32 which stores recently read or written database information. The SSM 28 reads and/or writes session information from/to the database cache 216. The index 204 indexes the database cache 216. In one embodiment, the index 204 uses a unique session information identifier (SID) to enable the SSM 28 to retrieve particular session information from the database cache 216.

The record cache 220 is a region of volatile memory 32 set aside to prevent partial writes to the persistent volatile memory 36. The record cache 220 stores at least one record of session information. Before updating the database cache 216 with session information, the SSM 28 stores the update in the record cache 220. In one embodiment, the record cache 220 specifies the exact location to store the session information in the database 224.

The log files 228, 232 are files that store the session information in the persistent volatile memory 36 before the SSM 28 stores the session information in the database 224. The SSM 28 uses the log files 228, 232 to recreate the session information after a server failure that occurred before transferring all of the session information to the database 224. One of the log files 228, 232 is an "active" log and the other log file 228, 232 is a "passive" log. The active log is a backup for the database cache 216. The SSM 28 uses the passive log file during the recovery process (i.e., after a server failure) to recreate lost session information at the server 4. In particular, the SSM 28 uses the passive log to recreate session information that was not stored in the database 224; this can occur because of a server failure prior to the completion of a transfer of session information from the database cache 216 to the database 224. Thus, in one embodiment the log files 228, 232 provide the SSM 28 with the last piece of session information that the SSM 28 transferred before the server 4 failed. In one embodiment, the log files 228, 232 are located in the persistent volatile memory 36. In another embodiment, either or both the first log 228 and the second log 232 are located in the persistent mass storage 22.

The execution thread 208 is a program, command, or part of a program or command that executes all application requests 236 that the SSM 28 receives from the application 18 (associated with a user request). The flushing thread 212 is a program, command, or part of a program or command that is responsible for flushing the volatile memory 32 (e.g., the database cache 216) to the persistent volatile memory 36 (e.g., the database 224).

In operation, the application 18 transmits the application request 236 to the SSM 28. The SSM 28 generates a record of session information associated with the application request 236 and stores the record in the record cache 220. The SSM 28 then transmits the record of session information from the record cache 220 to the active log. In one embodiment, the SSM 28 transmits the record of session information to the active log with a file "append" operation. The "append" operation is synchronous and, consequently, the SSM 28 waits for the "append" operation to commit the session information to the active log before continuing execution.

If a failure of the server 4 occurs prior to the completion of the transmission of the session information to the active log, the contents of the record cache 220 are lost and typically irretrievable. As stated above, the SSM 28 uses the log files 228, 232 as a backup for the database 224. Since the SSM 28 stores no updates to the session information in the database cache 221 prior to transmitting the session information to the active log, then no updates have been written to the database 224. In one embodiment, the server 4 transmits an error to the client 6 stating that the update to the session information was not stored. Upon recovery, the SSM 28 will determine that the session information was not stored in the log file 228, 232 and discard the portion of the update that was transmitted to the active log. The user of the server 4 may transmit the update to the session information again following recovery of the server 4.

In one embodiment, the SSM 28 employs the log files 228, 232 in an alternate manner. That is, the SSM 28 identifies one of the log files 228, 232 as the active log and the other log file 228, 232 as the passive log. Upon a triggering event, such as after a predetermined amount of time elapses or once a log file 228, 232 stores a predetermined amount of session information, the SSM 28 switches the identities of the log files 228, 232. Thus, the SSM 28 identifies the previously identified active log as a passive log and the previously identified passive log as an active log. It should be noted that the SSM 28 does not transfer the session information from one log 228, 232 to the other log 228, 232.

Once the record cache 220 completes its transmission of the record of session information to the active log, the record cache 220 then transmits the session information to the database cache 216. In one embodiment, the SSM 28 transmits the session information to the database cache 216 so that the SSM 28 has access to the session information using the volatile memory 32 (and therefore does not have to access the persistent volatile memory 36). Because the SSM 28 has already implemented a backup of the session information stored in the record cache 220 by updating the active log (before updating the database cache 216), the SSM 28 can transfer the session information to the database cache 216 without risk of losing the session information upon a failure of the server 4.

As illustrated in more detail below with respect to FIG. 5, upon a failure of the server 4 during the transmission of the session information to the database cache 216, the SSM 28 recreates the database cache 216 from the database file 224 and the log files 228, 232.

The SSM 28 then stores the session information in the database cache 216 before storing the session information in the database 224. Additionally, the SSM 28 can efficiently retrieve the session information from the volatile memory 32 (e.g., database cache 216) without having to access the persistent volatile memory 36 until the server 4 experiences a failure. In one embodiment, the operating system (not shown) flushes the database cache 216 to the database 224 at predetermined times.

In one embodiment, when the SSM 28 writes to the database cache 216, the operating system identifies that area of memory, or page of memory, as "dirty." A "dirty" page of memory is a page that is written to prior to transfer to the database 224. Once the operating system identifies the page in the database cache 216 as "dirty", the operating system asynchronously transmits all "dirty" memory pages to the database 224. Once a page is transmitted, the operating system marks the memory page as "clean." Thus, the operating system determines which memory pages are modified and consequently need to be transferred to the database 224.

When the operating system performs the asynchronous transfers illustrated above, the SSM 28 still accepts application requests 236 while the operating system updates the database 224. As described in more detail below, the updates done after the operating system has started the transfer are written to one of the two log files 228, 232 so that the log file 228, 232 previously written to can be deleted when the transfer is completed.

In another embodiment and as illustrated herein, the flushing thread 212 invokes an operating system command (i.e., a "flush" function) to transfer the session information from the database cache 216 to the database 224. In one embodiment, the flushing thread 212 asynchronously performs the transfer, as described above. In another embodiment, the flushing thread 212 synchronously performs the transfer, thus waiting for the current flush routine to complete before executing another flush routine. This synchronous transfer guarantees that all updates described in the database cache 216 are written to the database 224.

In greater detail, the application 18 transmits an application request 236 relating to session information to the SSM 28. The application request 236 is associated with the user request that the server 4 receives from the client 6. In one embodiment, the application request 236 interfaces with the SSM 28 via SSM commands. Examples of SSM commands include, without limitation, an SSM_Create command, an SSM_Get command, and an SSM_Put command.

The SSM_Create command creates a new session and returns a unique SID. If there is not enough memory available to generate new session information, the SSM 28 outputs an error message. The SSM_Get command returns the session information associated with the requested SID. For example, the SSM_Get command returns the session information as a binary large object (BLOB) (i.e., a collection of binary data stored as a single entity in a database management system). In another embodiment, the SSM_Get command returns the session information as a document, such as an Extensible Markup Language (XML) document. In another embodiment, the SSM_Get command returns the session information as a text document. The SSM_Put command replaces the record of the current session information associated with the SID with a record of updated session information. In a further embodiment, the SSM_Put command locates the particular byte or bytes that are being updated and only alters these bytes. In yet another embodiment, the application request 236 invokes a SSM_Delete command to delete the session information when that particular session information no longer has a value (e.g., when the server 4 no longer needs the session information because the communication session has ended). Although several embodiments of the application request 236 are presented above, the server 4 may also recognize additional requests 236.

As described above, the execution thread 208 executes the application request 236. In one embodiment, the execution thread 208 processes each SSM command as a transaction.

When the server 4 receives multiple user requests from the client 6 so that the application 18 transmits multiple application requests 236 to the SSM 28, the execution thread 208 executes each application request 236 (i.e., each SSM command) in a serial fashion. That is, the execution thread 208 executes the multiple application requests 236 one at a time and in the order that the SSM 28 receives each application request 236.

Upon the reception of an application request 236 to generate new session information (e.g., for a user who has not previously established a communication session with the server 4), the SSM 28 (i.e., the SSM_Create command) generates a record of session information in the record cache 220. As described in more detail below, the SSM 28 additionally uses the record cache 220 to update the cache entries in the database cache 216 by executing each update to the session information that the record describes. Eventually, the flushing thread 212 transfers the session information that the database cache 216 stores into the database 224 located in the persistent volatile memory 36. The flushing thread 212 executes the transfer in concurrence with the execution of the execution thread 208. In another embodiment, the flushing thread 212 transfers the session information from the database cache 216 to the database 224' located in the persistent mass storage 22.

The SSM 28 appends the record cache 220 to the active log before the SSM 28 uses the contents of the record cache 220 to update the database cache 216. If the flushing thread 212 writes only a portion of the session information to the database 224 because of a server failure, the SSM 28 completes during the recovery process (described further below in FIG. 5) the operation interrupted by the server failure by reading a copy of the record cache 220 from one of the log files 228, 231.

As an example of the invention with the record cache 220, if the application request 236 updates byte 5 and byte 25 of the session information, the SSM 28 generates a record for the two updates in the record cache 220. The SSM 28 then appends the record for the updates in the active log. The SSM 28 then performs these updates to the session information stored in the database cache 216. More specifically, the SSM 28 updates byte 5 and byte 25 of the session information stored in the database cache 216. The record cache 220 acts as an intermediary between the log files 228, 232 and the database cache 216. In another embodiment, the SSM 28 does not have a record cache 220 and writes the updates directly to the log file 228, 232 and then to the database cache 216.

Figure 3:
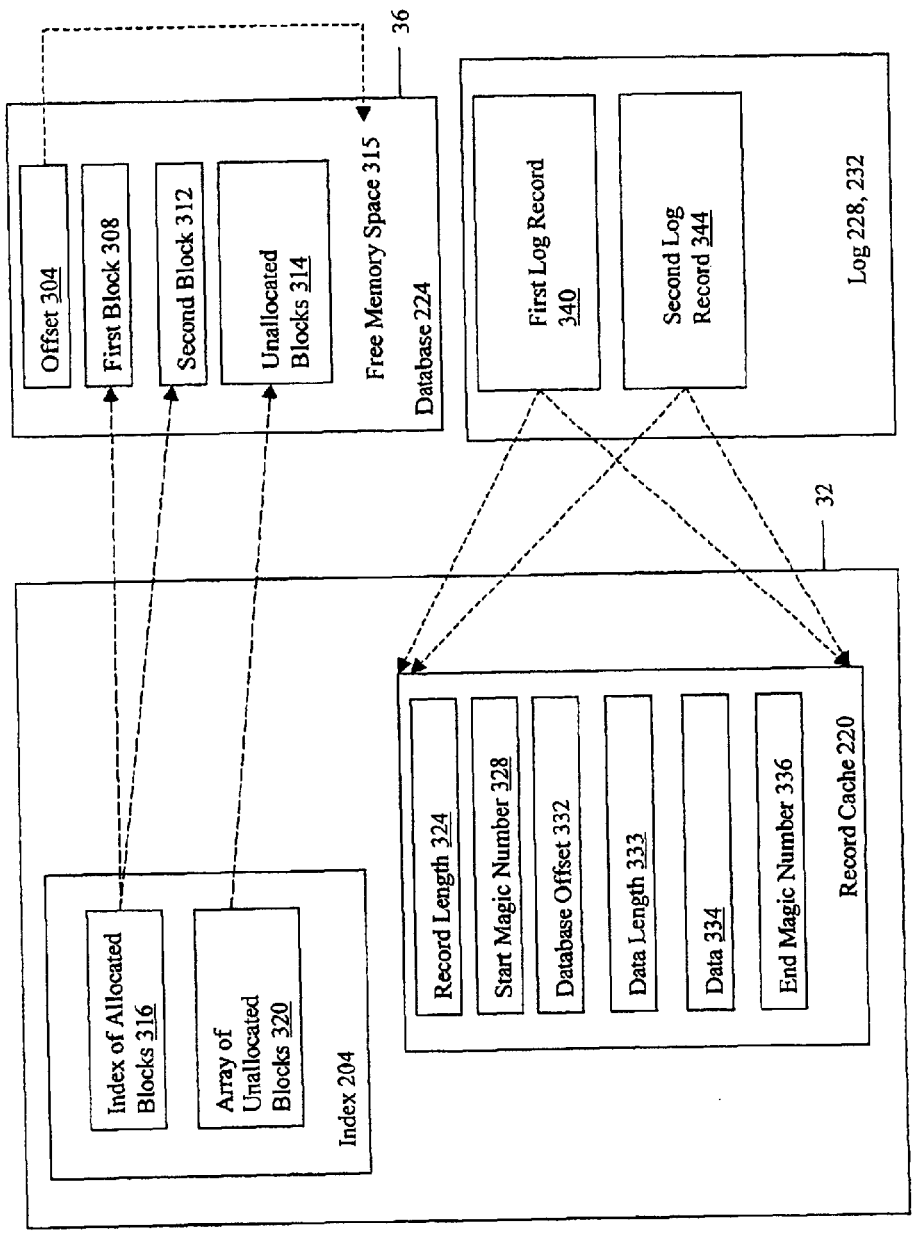
FIG. 3 is a block diagram of an embodiment of a structure of a database, a record cache, and a data structure stored in the server of FIG. 1A.

In one embodiment and also referring to FIG. 3, the database 224 (and the database cache 216) includes an offset 304 to linear free memory space 315 in the database 224. The database 224 is also composed of a list of consecutive allocated blocks 308, 312 and unallocated blocks 314. In particular, an allocated block (e.g., first block 308, second block 312) can contain "active" session information, which, in one embodiment, is session information that a request 236 has accessed within a predetermined amount of time. An unallocated block (e.g., unallocated blocks 314) is available to store session information. For example, an unallocated block (e.g., unallocated block 314) can be a memory block in the database 224 that had stored previously active session information which is no longer needed by the SSM 28. The free memory space 315 has never been touched by the SSM 28 and is used by the SSM 28 when no more unallocated blocks 314 exist.

In one embodiment, the SSM 28 associates an allocated block 308, 312 or an unallocated block 314 with an index 204 (e.g., record, list, linked list). Each block 308, 312, 314 may contain, without limitation, information on the type of block 308, 312, 314 (e.g., unallocated, allocated), the size of the block 308, 312, 314 (e.g., 128 bytes), the session information identifier (SID), the size of the session information stored in the block 304, 308, 312, and/or the session information.

In further embodiments, the SSM 28 maintains an index 316 of the allocated blocks 308, 312 for efficient retrieval of the session information stored in the allocated blocks 308, 312. In another embodiment, the SSM 28 additionally maintains an array 320 of the unallocated blocks 314 to manage the unallocated memory space available in the database 224.

Prior to storing a log record (e.g., a first log record 340, a second log record 344) containing session information in a log file 228, 232, in one embodiment the SSM 28 (e.g., SSM_Create command) generates a record of session information and stores the record in the record cache 220. In more detail and in the embodiment shown in FIG. 3, the record cache 220 and the log files 228, 232 include a record length 324, a start magic number 328, a database offset 332, a data length 333, data 334, and an end magic number 336. In one embodiment, the record length 324 is the length of the record of session information (e.g., the length of the first log record 340, the length of the second log record 344). The SSM 28 reads the record length 324 after a server failure so that the SSM 28 can read the rest of the log record 340, 344 at once. It should be noted that the information that the SSM 28 stores after the start magic number 328 (i.e., database offset 332, data length 333, data 334) can be repeated multiple times in the record cache 220 prior to the end magic number 336.

The magic numbers 328, 336 are numbers that the SSM 28 uses to verify the validity of the contents of the intermediate bytes of the respective log record (e.g., the first log record 340, the second log record 344) which are the database offset 332, the data length 333, and the data 334 (i.e., every bit after the start magic number 328 and before the end magic number 336).

In one embodiment, the magic numbers 328, 336 are identical random numbers (i.e., one random number generated for both magic numbers 328, 336) and the SSM 28 determines that the intermediate bytes of the log files 228, 232 have not been modified when the start magic number 328 is equivalent to the end magic number 336. In another embodiment, the magic numbers 328, 336 are predefined numbers. In yet another embodiment, different random number generators each create one of the magic numbers 328, 336. The SSM 28 determines the two random numbers that the random number generators select and determines that the intermediate bytes of the record cache 220 have not been modified when the start magic number 328 and the end magic number 336 are equivalent to the expected values. In other embodiments, the magic numbers 328, 336 are checksums. In yet another embodiment, the magic numbers 328, 336 are cyclic redundancy check (CRC) codes. It should be noted that the start magic number 328 and the end magic number 336 can be any values as long as the SSM 28 can determine whether the intermediate bytes in the log files 228, 232 have been modified.

As an example of the use of the magic numbers 328, 336, if a failure of the server 4 occurs in the middle of an "append" to log file operation described above, then the record cache 220 does not complete the transfer of every byte included in the record of session information stored in the record cache 220 to the log record 340, 344.

As part of the recovery process described below, the SSM 28 reads the record length 324, which contains the size of the log record 340, 344 stored in the log file 228, 232. If the SSM 28 determines that the size of the log file 228, 232 is less than the expected size that the SSM 28 read from the record length 324, then the SSM 28 determines that the failure of the server 4 occurred during the transmission of the session information from the record cache to the active log. The SSM 28 can discard that record of session information because that session information had not been stored in the database 224.

If the SSM 28 determines that the size of the active log is equivalent to the expected size, the SSM 28 verifies that the start magic number 328 is equivalent to the end magic number 336. In one embodiment, if the two magic numbers 328, 336 are equivalent, then the intermediate bytes are not corrupted.

Figure 4:
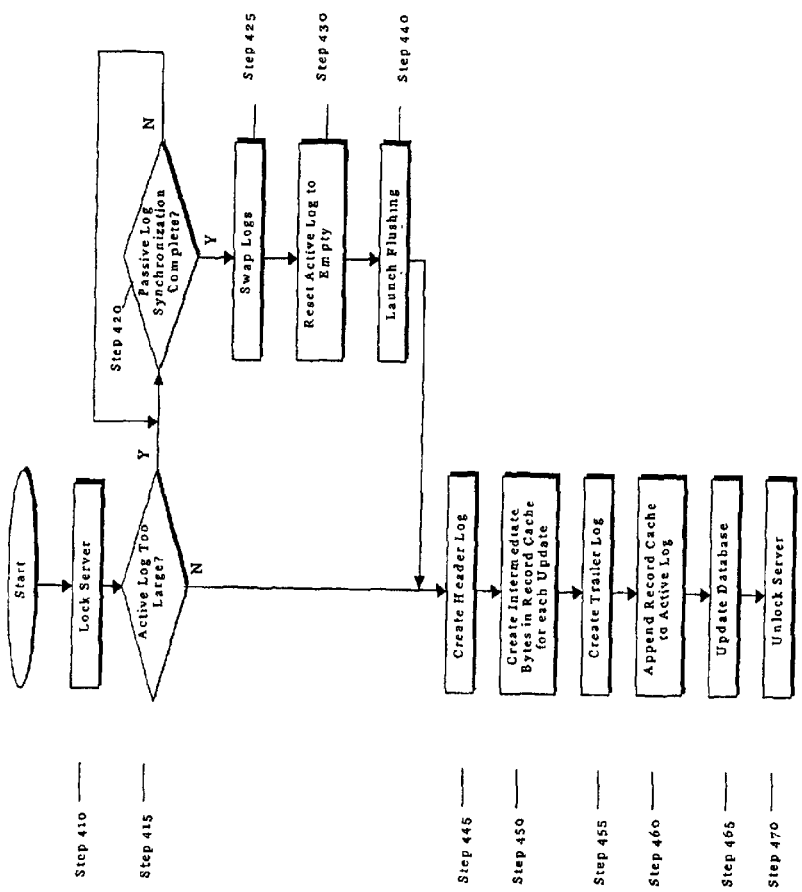
FIG. 4 is a flowchart illustrating an embodiment of the operation of a session storage manager to log the session information in accordance with the invention.

Referring again also to FIG. 1B, to enable the session information to survive a server failure, the server 4 stores the session information in persistent volatile memory 36. For example and also referring to FIG. 4, a user employs the client 6 and sends a user request to the server 4 to purchase an item. Assuming that the user has already established a communication session with the server 4, the server 4 has already generated session information for the particular user. Therefore, the server 4 has to update the session information associated with the particular user. In one embodiment, the user request includes the SID to identify the session information that will be updated.

In response to the user request, the application 18 instantiates the SSM 28 and makes an application request 236 to the SSM 28 to update the session information for the user. In one embodiment, the application request 236 invokes the SSM_Put command to update the session information. Further, the application request 236 (and consequently the SSM_Put command) includes the SID for identification of the session information.

In a typical computer system having a database, a transaction typically "locks" a record of a database before accessing the contents of the record. That is, the record is made inaccessible to other applications. In other embodiments, other applications can read the record but cannot write to the record until the execution of the transaction is complete.

An application may take a long time to complete a transaction. This long completion time can be a result of accessing a record that is stored on a disk or as a result of multiple database accesses, (e.g., as called for by the transaction). In both examples, the computer system (i.e., the processor of the computer system) has to either perform I/O (e.g., to access the record on the disk) or networking (e.g., if the typical computer system accesses the disk and/or the database over a network). For example, the computer system accesses a disk using an I/O controller similar to the I/O controller 10 described above. The I/O processing and/or the network processing adds further delays to the completion of the transaction.

Further I/O delays may arise due to a "database commit", which is the final step in the successful completion of a transaction (e.g., an SSM command). For example, all of the steps of a single transaction must be completed before the transaction is deemed successful and the database file is actually changed to reflect the transaction. When a transaction completes successfully, the changes to the file are said to be "committed."

Rather than locking a particular record, as a typical computer may do when accessing a record in the database, the SSM 28 (i.e., the SSM command) locks (step 410) the server 4 and thereby prevents access to the server until the session is complete. If the transaction accessing the database of the typical computer system described above locks the database (and not just a record stored in the database), other transactions are not able to access the components of the computer system (e.g., the microprocessor, the disk) while the microprocessor waits for the completion of the I/O or networking activity; this results in wasted resources and down-time of the computer system.

In the server 4 of FIG. 1A and FIG. 1B, all session information that the SSM 28 needs to execute the SSM command is located in the RAM memory 14. In particular, and as shown in FIG. 2, the database cache 216 is located in the volatile memory 32 and, consequently, the microprocessor 8 does not have to process any I/O (e.g., disk access) to execute an SSM command and thus access session information. Therefore, the SSM 28 experiences no delay due to I/O processing when accessing the session information. Moreover, the database 224 is located in the persistent volatile memory 36. Thus, the SSM 28 commits the session information to the database 224 located in the persistent volatile memory 36, thereby eliminating the I/O delay from a commit to a database located on a disk, as described above. Furthermore, each SSM command only reads and/or writes session information in the memory 32, 36. Therefore, the microprocessor 8 does not have to perform network processing because of the nature of the transactions.

Further, unlike the routine locking of a record, the SSM 28 locks the server 4 in step 410 to decrease the time spent in locking each record and to increase the speed at which the SSM 28 can access a record because the locking of the server 4 eliminates the overhead of locking each record (as well as the overhead of locking the index 204). Thus, the locking of the server 4 enables the SSM 28 to operate more efficiently and with less complexity. By eliminating network processing and I/O processing for transactions associated with the SSM 28, the SSM commands do not waste resources of the server 4 (e.g., microprocessor 8) despite the locking of the server 4.

For example, the SSM command associated with a user (and therefore an execution thread 208 associated with a user) possesses a token, which is a particular bit or series of bits that enable the execution thread 208 to update the record cache 220. With the correct token, the SSM command (i.e., the execution thread 208) locks the server 4 upon receipt of the application request 236. Thus, in one embodiment, if a second execution thread 208 attempts to update the record cache 220 with a second set of updates while a first execution thread 208 is updating the record cache 220 with a first set of updates, the second execution thread 208 will not be able to update the record cache 220 because the second execution thread 208 (associated with the second SSM command) will not have valid permission to do so.

The SSM 28 then determines (step 415) if the active log is above a predefined size. If the active log is above the predefined size, the SSM 28 determines (step 420) if the passive log and the database 224 are "synchronized." That is, the SSM 28 determines if all of the contents of the passive log have been reflected in the database 224 (i.e., the execution thread 208 has transmitted all of the updates that are stored in the passive log to the database cache 216 and the flushing thread 228 has subsequently transferred these updates from the database cache 216 to the database 224). In another embodiment, the SSM 28 determines in step 420 if the synchronization between the passive log and the database 224 is complete after a predetermined amount of time.

If the synchronization is not complete, the SSM 28 waits until the contents of the passive log are reflected in the database 224. When the database 224 includes the contents of the passive log, the SSM 28 swaps (step 425) the active log and the passive log and then resets (step 430) the newly named active log to an unallocated, or empty, state. In one embodiment, the SSM 28 resets the newly named active log to an unallocated state because the contents of that log were just transferred to the passive log.

In another embodiment, the predefined size of the active log is adjusted so that the flushing thread 212 completes before the active log reaches the predefined size. In this scenario, the SSM 28 can skip step 420 and consequently swap the logs 228, 232 following the determination that the active log has reached the predefined size.

Once the active log is reset to an unallocated state, new updates to the session information for the particular user may occur and the SSM 28 stores these updates in the active log (i.e., the previously named passive log) and then in the database cache 216. Therefore, to transfer the updates from the database cache 216 to the database 224, the SSM 28 launches (step 440) the flushing thread 212.

If the SSM 28 determines in step 415 that the size of the active log has not reached the predefined size or if the SSM 28 launches the flushing thread 212 in step 440, the SSM 28 creates (step 445) a header log. In one embodiment, the header log includes the record length 324 and the start magic number 328.

The SSM 28 (i.e., the SSM command) then creates (step 450) the intermediate bytes (i.e., the database offset 332, the data length 333, and the data 334) in the record cache 220 for each update to the session information relating to the application request 236 (e.g., relating to the item that the user requests to purchase). The SSM 28 then creates (step 455) a trailer log, which in one embodiment includes the end magic number 336 of the record cache 220, and updates the record length 324.

The execution thread 208 then appends (step 460) the record cache 220 to the active log so that the updated session information is stored in the persistent volatile memory 36. Following the transfer of the session information to the active log, the execution thread 208 updates (step 465) the database cache 216 with the updates stored in the record cache 220. In one embodiment, the transfer of this session information to the database 224 is done asynchronously by the flushing thread 412 in step 440. The SSM 28 then unlocks (step 470) the server.

Figure 5:
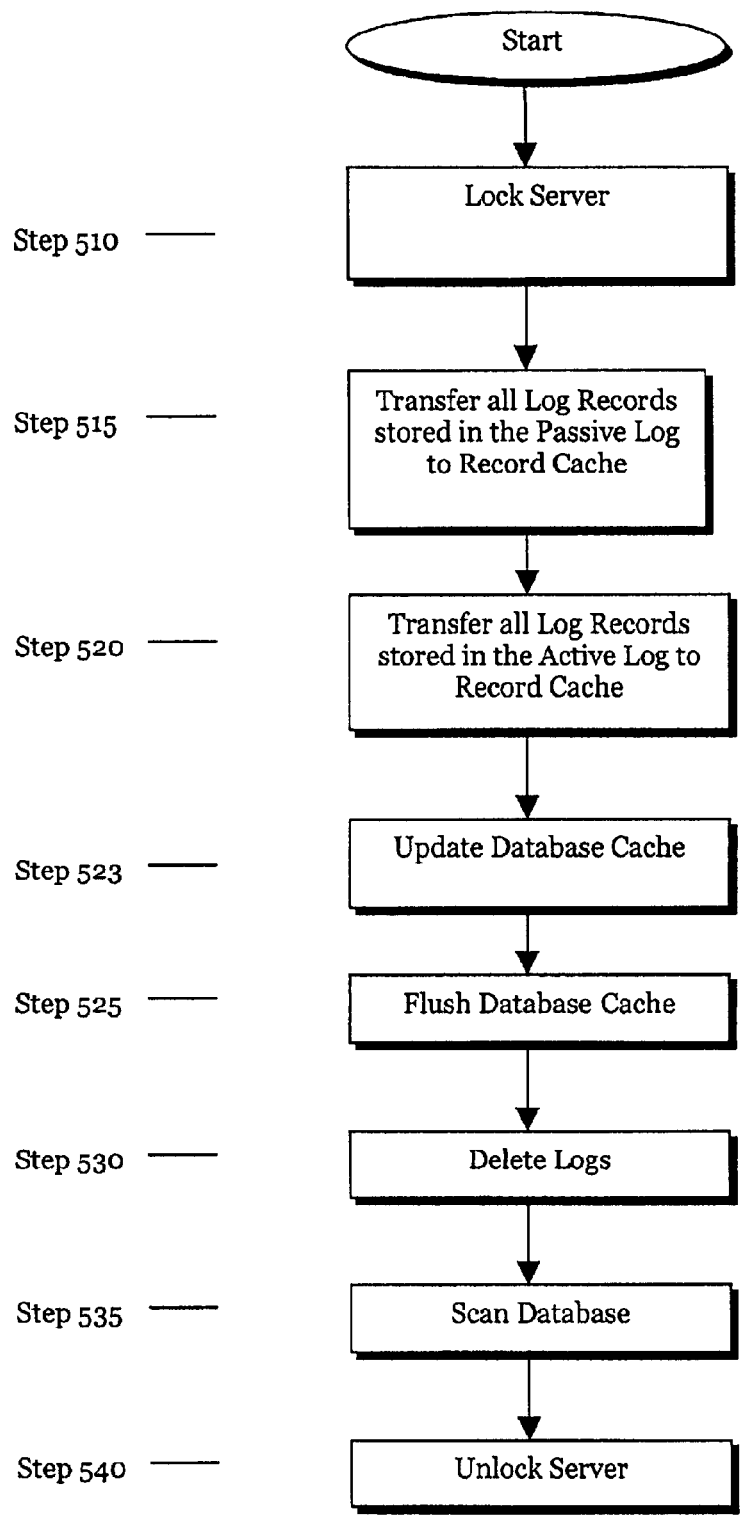
FIG. 5 is a flowchart illustrating an embodiment of the operation of the session storage manager to recover from a failure of the server in accordance with the invention.

To recover the session information following a server failure and also referring to FIG. 5, the SSM 28 "locks" (step 510) the server 4, as described above with respect to FIG. 4, to execute the recovery process. In one embodiment, the SSM 28 determines whether the SSM command has valid permission to access the database 224 before locking the server 4. Further, the SSM 28 needs to recreate the session information that was previously stored in the database cache 216. Moreover, the SSM 28 needs to ensure that the database 224 contains all of the session information that was previously stored in the log files 228, 232 (e.g., the session information that was written to the database cache 216 for transfer to the database 224 prior to the server failure and also prior to the completion of the flushing thread 212 transferring the updates to the database 224). Therefore, the execution thread 208 transfers (step 515) all records in the passive log to the record cache 220 and then transfers (step 520) all records in the active log to the record cache 220 (i.e., transfers the records 340, 344 in the log files 228, 232 in the same order that the SSM 28 had generated the records 340, 344 in the log files 228, 232). From there, the execution thread 208 performs (step 523) the updates described in the record cache 220 into the database cache 216, as described above in step 465.

To update the database 224 with the session information that had not been transferred to the database 224 prior to the server failure, the SSM 28 invokes the flushing thread 212 and flushes (step 525) the contents of the database cache 216 to the database 224. Once this completes (and therefore once all of the session information is stored in the database 224), the SSM 28 deletes (step 530) the log files 228, 232 because the session information stored in the log files 228, 232, has just been transferred to the database 224. The SSM 28 then scans (step 535) the database 224 to recreate the information stored in the index 204 (e.g., index 316 of allocated blocks, array 320 of unallocated blocks). Once the SSM 28 restores the session information, the SSM 28 unlocks (step 540) the server 4.

In an environment with multiple clients, the server 4 can also use the invention to conduct a statistical analysis on all session information to determine the behavior of the multiple clients and to observer trends in the marketplace. In particular, the application request 236 can be a request to scan all session information for statistical purposes. In a further embodiment, the scan determines if any session information has been modified after a predetermined time.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for managing session information in a client-server environment comprising:
    (a) establishing a communication session between a client and a server;
    (b) storing, by the server, session information associated with the communication session between the client and the server in a first log file stored in a persistent volatile memory;
    (c) storing the session information in a cache file stored in a volatile memory of the server; and
    (d) reconstructing, by the server, the cache file after a server failure using the session information stored in the first log.
2. The method of claim 1 further comprising the step of identifying the communication session with a session identifier.
3. The method of claim 1 further comprising the step of scanning the session information for statistical purposes.
4. The method of claim 1 further comprising swapping the first log file with a second log file to store the session information when a certain predetermined criteria is met.
5. The method of claim 4 wherein the predetermined criteria further comprises when the size of the first log file exceeds a predefined size.
6. The method of claim 4 wherein the predetermined criteria further comprises when a predetermined amount of time has elapsed.
7. The method of claim 4 further comprising the step of resetting the first log file to an unallocated state.
8. The method of claim 1 further comprising transferring the session information from the cache file stored in the volatile memory to a database located in a persistent mass storage.
9. The method of claim 1 further comprising the steps of:
    (e) serializing multiple requests from a client; and
    (f) updating the session information for each request.
10. The method of claim 9 wherein step (f) further comprises the step of:
    (f-a) creating the session information for each request.
11. The method of claim 1 wherein step (d) further comprises the steps of:
    (d-a) locking the server;
    (d-b) transferring the session information stored in the first log file to the cache file;
    (d-c) transferring the session information in the cache file to a database stored in the persistent volatile memory;
    (d-d) deleting the first log file; and
    (d-e) scanning the database to recreate information stored in a data structure, wherein the information stored in the data structure comprises an index of the cache file.
12. The method of claim 1 further comprising the step of locking the server.
13. A session storage manager for managing session information in a client-server environment, the session storage manager comprising:
    (a) a persistent volatile memory;
    (b) a first log file, stored in the persistent volatile memory, containing session information;
    (c) a record cache storing a record of session information;
    (d) an execution thread appending the session information stored in the record cache to the first log file;
    (e) a database cache storing the session information after the session information has been stored in the first log file;
    wherein the session storage manager reconstructs the database cache after a server failure using the session information stored in the first log file.
14. The session storage manager of claim 13 further comprising:
    (f) a volatile memory;
    (g) a persistent mass storage;
    (h) a database having an address space in the persistent mass storage and in communication with the execution thread; and
    (i) a flushing thread transferring the session information stored in the database cache to the database.
15. The session storage manager of claim 14 wherein the record cache is stored in the volatile memory.
16. The session storage manager of claim 14 wherein the record cache prevents partial writes of the session information to the database by the flushing thread.
17. The session storage manager of claim 14 wherein the record cache further comprises at least one of a record length, a start magic number, a data length, a database offset, data, and an end magic number.
18. The session storage manager of claim 17 wherein the start magic number and the end magic number are used to verify the validity of the contents of at least one of the record length, the data length, the database offset, and the data.
19. The session storage manager of claim 14 wherein the database further comprises at least one of an allocated block containing active session information, an unallocated block available to store the session information, free memory space, and an offset to the free memory space available to store the session information.
20. The session storage manager of claim 14 wherein the persistent mass storage further comprises the persistent volatile memory.
21. A session storage manager for managing session information in a client-server environment, the session storage manager comprising:
    (a) means for establishing a communication session between a client and a server;
    (b) means for storing, by the session storage manager, session information for the communication session to a first log file stored in a persistent volatile memory;
    (c) means for storing the session information in a cache file stored in a volatile memory; and
    (d) means for reconstructing, by the session storage manager, the cache file using the session information stored in the first log.

* * * * *